May 23, 1967  P. C. NICHOLSON  3,321,208
PHONOGRAPH BOOK WITH INDEXING MEANS
Filed Feb. 8, 1965
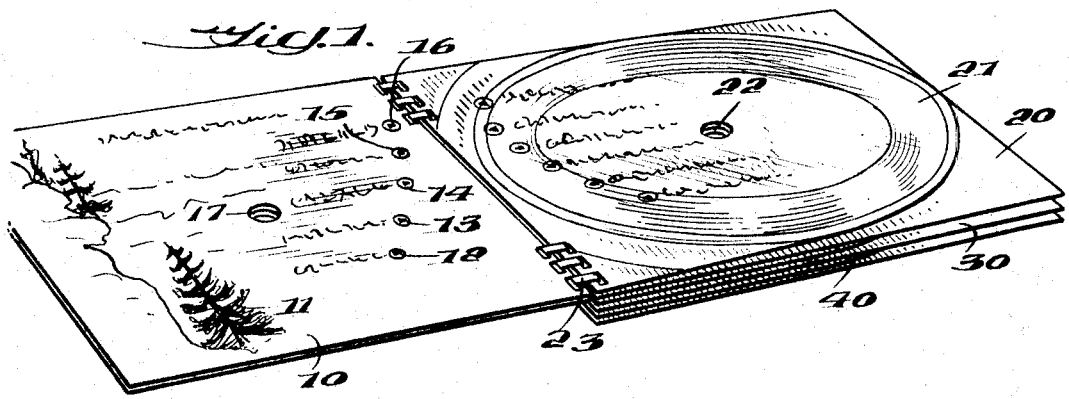
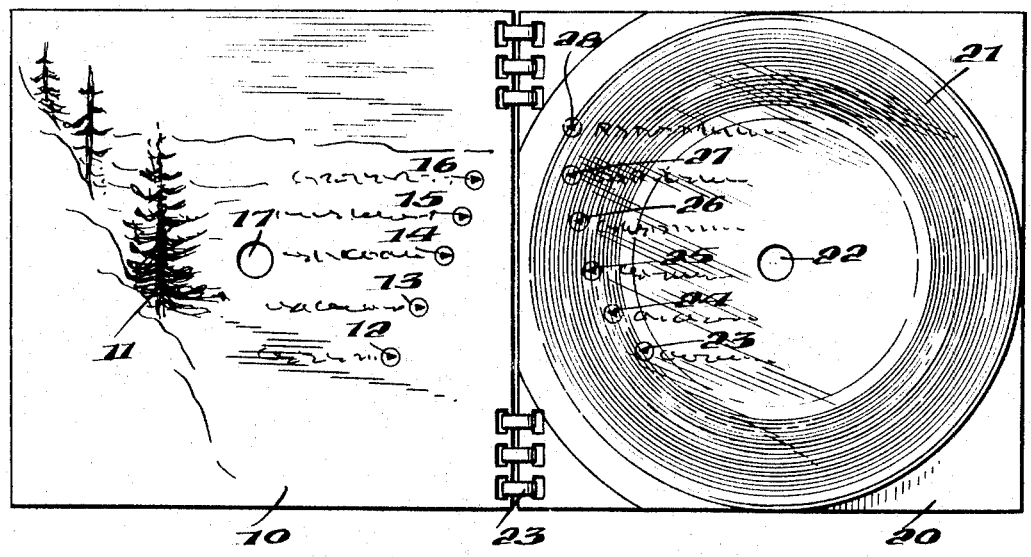
INVENTOR
PATRICIA COYLE NICHOLSON,
BY  Dos T. Hatfield
ATTORNEY United States Patent Office 3,321,208
Patented May 23, 1967

3,321,208
PHONOGRAPH BOOK WITH INDEXING MEANS
Patricia Coyle Nicholson, Washington, D.C., assignor to National Geographic Society, a corporation of the District of Columbia
Filed Feb. 8, 1965, Ser. No. 430,862
8 Claims. (Cl. 274—42)

The present invention relates to combined visual and aural information recordings and more particularly to an improved visual and aural record assemblage in book form.

For both educational and amusement purposes, it is a well established practice to record the various sounds of man's environment. For example, the songs of birds in their natural environment have been recorded and are available as conventional disc phonograph records. With the modern slow speed recording techniques, it is possible to record the songs of a number of different birds successively on each side of a record disc, thus making it desirable to have some visible arrangement for cueing the physical portion of the start of each different song that may be successively recorded on the record.

It is a principal object of the present invention to provide an improved combined visual and aural information recording arrangement in book form with a visual record sheet having cueing marks for the aural record sheet together with other visual information as desired for the recorded information which may be recorded on one or both sides of an aural record sheet also bound in book form with the visual record sheet.

In accordance with the invention, an aural record is formed of a transparent leaf of sheet material having a sound recording on at least one side thereof. A visual record leaf is formed of a sheet of material having visual information which may include cueing indicia relative to the aural record printed or otherwise formed on at least one side thereof. Both of said visual and aural leaves are bound together in book form by a binding means sufficiently flexible to permit the transparent aural leaf to be moved to a flat position overlying either side of the visual leaf so that desired indicia on either side of the visual leaf may be visible through the transparent aural leaf from a selected exposed surface thereof. It is also a feature of the invention to provide, if desired, a plurality of inter-leaved visual and aural record leaves bound in book form with visual and aural leaves alternating and having sound information recorded on both sides of each aural leaf with visual information recorded on both sides of each visual leaf. An aperture is provided through each visual and aural leaf in alignment with each other whereby the book may be placed on a phonograph turntable for reproduction of the recorded sound which may be recorded and reproduced by any suitable and conventional recording technique such as electro-mechanical, magnetic and the like.

Further objects, features and the attendant advantages of the invention will be apparent with reference to the following specification and drawing in which:

FIG. 1 is a perspective view of the record book of the invention in open book position;

FIG. 2 is a plan view of the invention similar to FIG. 1; and

FIG. 3 is a side elevation of the invention.

Referring to the drawing, the combined visual and aural record book is shown to be comprised of at least one visual sheet or leaf 10 having printed or otherwise produced visual indicia 11 thereon together with cueing marks 12-16 to be later referred to in detail on at least one side thereof. At least one aural record leaf 20 of transparent sheet material is provided with sound information recorded thereon as shown by the helical recording grooves 21. Although it is preferred to emboss the sound information with the use of the conventional helical disc recording grooves 21, it should be understood that the invention is not limited to a particular form of sound recording. A central aperture 17 is provided in the visual leaf 10 and a similar central aperture 22 is provided in the aural leaf 20 and both leaves 10 and 20 are bound together by suitable binding means such as the plurality of binder rings, one of which is designated at 23, in a manner such that the apertures 17 and 22 will be in alignment with each other and central to the helical recording grooves when the book is in a closed form (now shown) with the transparent leaf 20 overlying the visual leaf 10.

In its preferred embodiment, multiple leaves would be used with at least two visual record leaves, such as the leaf 10 and leaf 30, bound in inter-leaving alternating arrangement adjacent a transaprent aural leaf 20. Additional aural leaves such as the leaf 40 may also be provided although the invention contemplates that as few as only one aural and visual leaf, respectively, may be used. For example, as shown by FIG. 3 of the drawing, additional visual leaves 50, 70, and an aural leaf 60 may also be found in the book so that obviously the number of leaves in the book may vary from one aural and one visual to any number of aural and visual leaves as desired. Central apertures are, of course, provided in each leaf of the book to enable the placement of the book on a phonograph turntable or the like. Also, although recorded visual and aural information, respectively, may be placed on one side only of each respective visual and aural record leaf, the invention in its preferred form would contain the appropriate visual or aural recorded information on both sides of each record leaf.

It is pointed out that the binding rings, such as the ring 23 or whatever other known form of binding is used, must be sufficiently flexible to permit the book to be manipulated to have a first side of an aural record leaf such as the leaf 20 exposed and lying flat over an underlying visual record sheet such as the sheet 30 with all other record sheets in the book also underlying in succession so that the book may be placed on a phonograph turntable to reproduce the sound recorded on the upper exposed surface or first side of the record leaf 20. Since the upper record leaf 20 is transparent, the indicia such as cueing marks 23-28 on the visual record leaf 30 will be visible therethrough. If such indicia 23-28 is comprised of cueing marks similar to the cueing marks 12-16 of visual leaf 10, the user will be informed of the correct starting point for a desired bit of recorded sound information on the first side of the aural record leaf 20 such as the recorded song of a particular bird.

Assuming sound information to be recorded on both sides of the aural leaf 20, the book may be manipulated to place the second side of the aural leaf 20 in a position overlying the visual record leaf 10 with the cueing marks 12-16 at the appropriate positions for the recorded information on the second side of the aural leaf 20 visible therethrough.

It should now be understood that the combined visual and aural record book of the invention may be used and manipulated to expose any desired side of a transparent aural record leaf over a next adjacent visual record leaf so that corresponding visual and aural recorded material such as different bird songs and the appropriate identifying cure marks may be correctly interrelated.

Various modifications may be made within the spirit of the invention and the scope of the appended claims.

What is claimed is:

1. A combined visual and aural information record book comprising one or more visual indicia leaves of sheet material, one or more aural leaves of transparent sheet material containing recorded sound information, means binding said leaves in interleaving relation with respective ones of said aural leaves adjacent respective ones of said visual leaves, said binding means being sufficiently flexible to permit any one of said leaves to be moved from an overlying position to an underlying position to thereby position a selected side of one of said aural leaves over a selected side of one of said visual leaves, and an aperture extending through each of said leaves in alignment to enable the record to be placed on a reproducing turntable whereby the recorded sound on a selected side of a transparent aural leaf may be reproduced while said aural leaf is in a position overlying the indicia on the selected side of the visual leaf therebeneath.

2. The invention of claim 1 in which the indicia on said visual sheet includes at least one cueing mark identifying the physical position of a certain portion of recorded information for the upper side of an overlying aural record sheet.

3. A combined visual and aural information record book comprising one or more visual indicia leaves of sheet material having indicia on both sides thereof, one or more aural leaves of transparent sheet material containing recorded sound information on both sides thereof, means binding said leaves in interleaving relation with respective ones of said aural leaves adjacent respective ones of said visual leaves, said binding means being sufficiently flexible to permit any one of said leaves to be moved from an overlying position to an underlying position to thereby position a selected side of one of said aural leaves over a selected side of one of said visual leaves, and an aperture extending through each of said leaves in alignment to enable the record to be placed on a reproducing turntable whereby the recorded sound on a selected side of a transparent aural leaf may be reproduced while said aural leaf is in a position overlying the indicia on the selected side of the visual leaf therebeneath.

4. The invention of claim 3 in which the indicia on said visual sheet includes at least one cueing mark identifying the physical position of a certain portion of recorded information for the upper side of an overlying aural record sheet.

5. A combined visual and aural information record book comprising one or more visual indicia leaves of sheet material, one or more aural leaves of transparent sheet material containing helical disc recorded sound information, means binding said leaves in interleaving relation with respective ones of said aural leaves adjacent respective ones of said visual leaves, said binding means being sufficiently flexible to permit any one of said leaves to be moved from an overlying position to an underlying position to thereby position a selected side of one of said aural leaves over a selected side of one of said visual leaves, and an aperture extending through each of said leaves in alignment and centrally of said helical disc recorded sound information to enable the record to be placed on a reproducing turntable whereby the recorded sound on a selected side of a transparent aural leaf may be reproduced while said aural leaf is in a position overlying the indicia on the selected side of the visual leaf therebeneath.

6. The invention of claim 5 in which the indicia on said visual sheet includes at least one cueing mark identifying the physical position of a certain portion of recorded information for the upper side of an overlying aural record sheet.

7. A combined visual and aural information record book comprising one or more visual indicia leaves of sheet material having indicia on both sides thereof, one or more aural leaves of transparent sheet material containing helical disc recorded sound information on both sides thereof, means binding said leaves in interleaving relation with respective ones of said aural leaves adjacent respective ones of said visual leaves, said binding means being sufficiently flexible to permit any one of said leaves to be moved from an overlying position to an underlying position to thereby position of selected side of one of said aural leaves over a selected side of one of said visual leaves, and an aperture extending through each of said leaves in alignment and centrally of said helical disc recorded sound information to enable the record to be placed on a reproducing turntable whereby the recorded sound on a selected side of a transparent aural leaf may be reproduced while said aural leaf is in a position overlying the indicia on the selected side of the visual leaf therebeneath.

8. The invention of claim 7 in which the indicia on said visual sheet includes at least one cueing mark identifying the physical position of a certain portion of recorded information for the upper side of an overlying aural record sheet.

References Cited by the Examiner

FOREIGN PATENTS

| 341,146 | 1/1931 | Great Britain. |
|---|---|---|
| 800,996 | 9/1958 | Great Britain. |

References Cited by the Applicant

UNITED STATES PATENTS

| 418,489 | 4/1943 | Routin. |
|---|---|---|
| 802,135 | 1905 | Bryant. |
| 1,502,312 | 1924 | Mayhew. |
| 2,511,708 | 1950 | Hammond. |

FOREIGN PATENTS

| 476,679 | 1936 | Great Britain. |
|---|---|---|
| 1,166,839 | 1958 | France. |
| 564,496 | 1958 | Belgium. |

LEONARD FORMAN, *Primary Examiner.*

F. J. D'AMBROSIO, *Assistant Examiner.*